(12) United States Patent
Bacon et al.

(10) Patent No.: US 7,862,958 B2
(45) Date of Patent: Jan. 4, 2011

(54) RETAINING APPARATUS FOR ELECTROCHEMICAL GENERATOR

(75) Inventors: Bruno Bacon, Montreal (CA); Réjean Ardouin, Montreal (CA); Martin Burns, Chambly (CA); Anthony Sudano, Laval (CA); Jean-Philippe Castonguay, Varenne (CA)

(73) Assignee: Bathium Canada Inc., Boucherville (CA)

( * ) Notice: Subject to any disclaimer, the term of this patent is extended or adjusted under 35 U.S.C. 154(b) by 1183 days.

(21) Appl. No.: 10/839,236

(22) Filed: May 6, 2004

(65) Prior Publication Data

US 2005/0250005 A1 Nov. 10, 2005

(51) Int. Cl.
*H01M 8/00* (2006.01)
(52) U.S. Cl. ............ 429/535; 29/623.1; 29/623.2
(58) Field of Classification Search ............ 429/12, 429/34, 35, 37, 66, 152, 159; 29/623.2
See application file for complete search history.

(56) References Cited

U.S. PATENT DOCUMENTS

| | | | |
|---|---|---|---|
| 4,692,391 A | 9/1987 | Hirota | |
| 5,009,968 A * | 4/1991 | Guthrie et al. | 429/26 |
| 6,087,036 A | 7/2000 | Rouillard et al. | |
| 6,218,039 B1 | 4/2001 | Mease et al. | |
| 6,428,921 B1 | 8/2002 | Grot | |
| 6,689,503 B2 | 2/2004 | Yang | |
| 2002/0061430 A1 * | 5/2002 | Wakahoi et al. | 429/32 |
| 2003/0203269 A1 * | 10/2003 | Rock | 429/37 |

* cited by examiner

*Primary Examiner*—Patrick Ryan
*Assistant Examiner*—Muhammad Siddiquee
(74) *Attorney, Agent, or Firm*—Osler, Hoskin & Harcourt LLP

(57) ABSTRACT

The invention provides an electrochemical generator having a retaining apparatus for maintaining a stack of electrochemical cells in a state of compression. The electrochemical generator comprises an assembly of electrochemical cells comprising a plurality of stacked electrochemical cells and a retaining apparatus comprising holding members positioned at each extremity of the assembly and anchoring devices maintaining the holding members at a predetermined distance from one another thereby maintaining the assembly under a state of compression.

7 Claims, 5 Drawing Sheets

RETAINING APPARATUS FOR ELECTROCHEMICAL GENERATOR

FIELD OF THE INVENTION

The present invention relates to polymer batteries made from a plurality of laminated electrochemical cells and, more specifically, to a retaining apparatus adapted to maintain a stack of electrochemical cells under a state of compression in order to ensure optimal electrochemical performance.

BACKGROUND OF THE INVENTION

Laminated electrochemical cells are typically arranged in a stack configuration and interconnected to form larger power producing devices, such as modules or batteries. A grouping of electrochemical cells may be selectively interconnected in a parallel and/or series relationship to achieve a desired voltage and current rating.

It has been determined that the performance and service-life of such modules or batteries are significantly improved by maintaining the layers of the stacked electrochemical cells in a state of compression. Improved cell performance may be realized by maintaining pressure on the two larger opposing surfaces of the cells during cell cycling. The thermal conduction characteristics of a stack of electrochemical cells are significantly improved when forced contact between adjacent cells is maintained. It is considered desirable that the compressive forces be distributed uniformly over the surface of application.

One factor that complicates the effective thermal and electrical conduction for thin-film electrochemical cells in a stack configuration is the cyclical changes in cell volume that occur during charge and discharge cycles. The volume of an electrochemical cell varies during charge and discharge cycling due to the migration of ions, for example lithium ions, into and out of the lattice structure of the cathode material. This migration causes a corresponding increase and decrease in total cell volume in the order of as much as ten percent during charging and discharging, respectively. The volume of the cells also fluctuates with temperature variation such that thermal dilatation and contraction may represent as much as a five percent increase and decrease, respectively, in total cell volume. In modules or batteries comprising numerous thin-film electrochemical cells in a stack configuration, the volume change is compounded such that the overall volume change is significant and must be accommodated.

In order to accommodate these compounded variations in electrochemical cell volume resulting from charge and discharge cycling of a grouping of cells, a pressure producing apparatus within the walls of the containment vessel of the battery is employed to maintain the cells in a continuous state of compression. An active pressure generating mechanism, such as a foam element or a spring-type element adjacent to the walls of the containment vessel is used to apply an evenly distributed pressure onto the outer surfaces of the outer cells of the cell stack during charge/discharge cycling. For large battery applications, the active pressure generating mechanism is typically comprised of a plurality of metal springs applying pressure against a metal plate which can generate the necessary compressive force, and may include spring inserts located between adjacent cells within the cell stack to enhance distribution of compressive forces within the cell stack.

In the manufacturing of stacked electrochemical cells, the electrochemical cells are stacked between a pair of pressure producing apparatus, the assembly is introduced into an hydraulic press where it is compressed to the target pressure and the assembly is mechanically tied together with a series of straps to maintain it at the target pressure. In the strapping operation, each strap is wrapped around the assembly of stacked electrochemical cells and pressure producing apparatus and spot welded to lock it in position. The wrapping and welding operation is time-consuming and requires an elaborate apparatus comprising an hydraulic press, a wrapping device and a welding head.

Thus, there is a need in the industry for a simple and efficient device for maintaining an assembly of stacked electrochemical cells under a state of compression.

SUMMARY OF THE INVENTION

It is therefore an object of the present invention to provide a retaining apparatus for an electrochemical generator that is cost effective and simple to assemble.

In accordance with a broad aspect, the invention provides an electrochemical generator comprising: an assembly of electrochemical cells comprising a plurality of stacked electrochemical cells and a retaining apparatus comprising holding members positioned at each extremity of the assembly and anchoring devices maintaining the holding members at a predetermined distance from one another thereby maintaining the assembly under a state of compression.

In a specific example of implementation, the electrochemical generator comprises a pair of anchoring devices, one on each side of the assembly, each anchoring devices being made of a single plate.

In accordance with another broad aspect, the invention provides an apparatus for maintaining a stack of electrochemical cells in an electrochemical generator in a state of compression, the apparatus comprising: a pair of holding members positioned at each extremity of the stack of electrochemical cells; and anchoring devices maintaining the holding members at a predetermined distance from one another thereby maintaining the stack of electrochemical cells under a minimum pressure.

BRIEF DESCRIPTION OF THE DRAWINGS

A detailed description of specific embodiments of the present invention is provided herein below with reference to the following drawings, in which.

Figure 1:
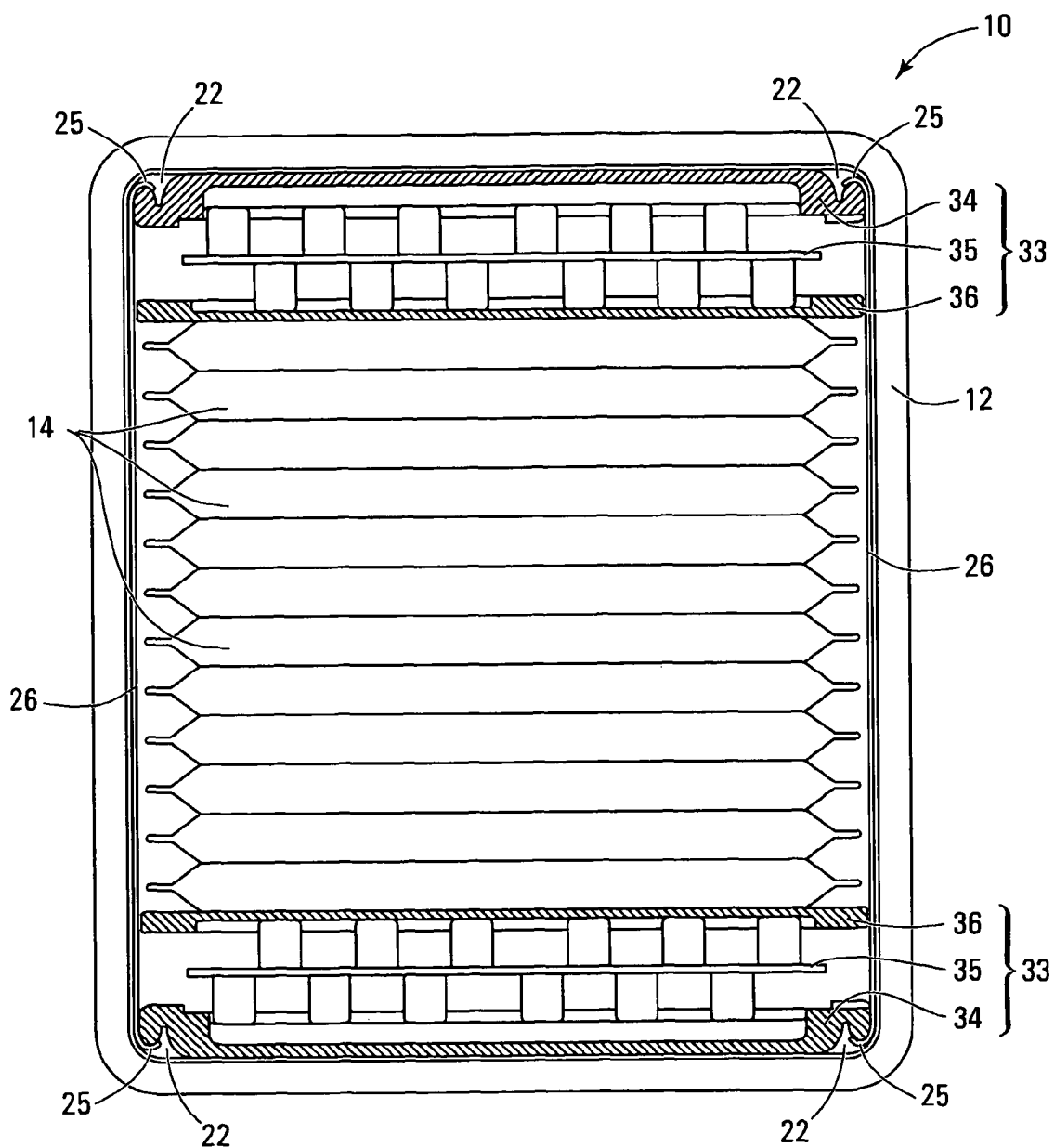
FIG. 1 is a schematic front cross-sectional view of an electrochemical generator having a retaining apparatus in accordance with one embodiment of the invention.

In the drawings, specific embodiments of the invention are illustrated by way of examples. It is to be expressly understood that the description and the drawings are only for the purpose of illustration and as an aid to understanding. They are not intended to be a definition of the limits of the invention.

DETAILED DESCRIPTION

With reference to FIG. 1, there is shown the frontal cross-section of an example of a stacked electrochemical generator 10. The electrochemical generator 10 comprises a protective enclosure or casing 12 in which an array of electrochemical cells 14 are stacked together to form a battery. The electrochemical cells 14 may be electrically connected in series, in parallel or combination thereof depending on the desired voltage and current output. In the example shown, each electrochemical cell 14 comprises an array of thin film laminates each comprising at least one sheet-like anode, at least one sheet-like cathode on a current collecting element, and an electrolyte separator interposed between the anode and the cathode.

The performance and service-life of modules or batteries such as the electrochemical generator 10 are significantly improved by maintaining the stack of electrochemical cells 14 in a state of compression. An even distribution of pressure on the stack of electrochemical cells 14 increases the quality of the interface contacts between anode, separator and cathode of each laminate included in each electrochemical cell 14.

Specific to the present invention, the electrochemical generator 10 includes a pressure producing apparatus 33 positioned at each end of the stack of electrochemical cells 14, to maintain the array of stacked electrochemical cells 14 in a state of compression while the cyclical changes in the total volume of the stack of electrochemical cells 14 occur during charge and discharge. In the specific example illustrated in FIGS. 1 and 2, the pressure producing apparatus 33 is formed of a rear plate 34, a pressure plate 36, and a spring plate 35 located in between plates 34 and 36 which provides the compressive force required to maintain pressure on the two extremities of the stack of electrochemical cells 14 while cyclical volume changes occur. The rear plates 34 at each extremities of the stack of electrochemical cells 14 are provided with indents or grooves 22 in which the hook portion 25 of anchoring devices 26 are received. Anchoring devices 26 maintain rear plates 34 at a predetermined distance from one another thereby maintaining the stack of electrochemical cells 14 under an initial minimum pressure which increases as the volume of cells 14 increases during discharge and compressed spring plates 35. In this specific example, there are two anchoring devices 26 located on either sides of the stack of electrochemical cells 14.

Figure 3:
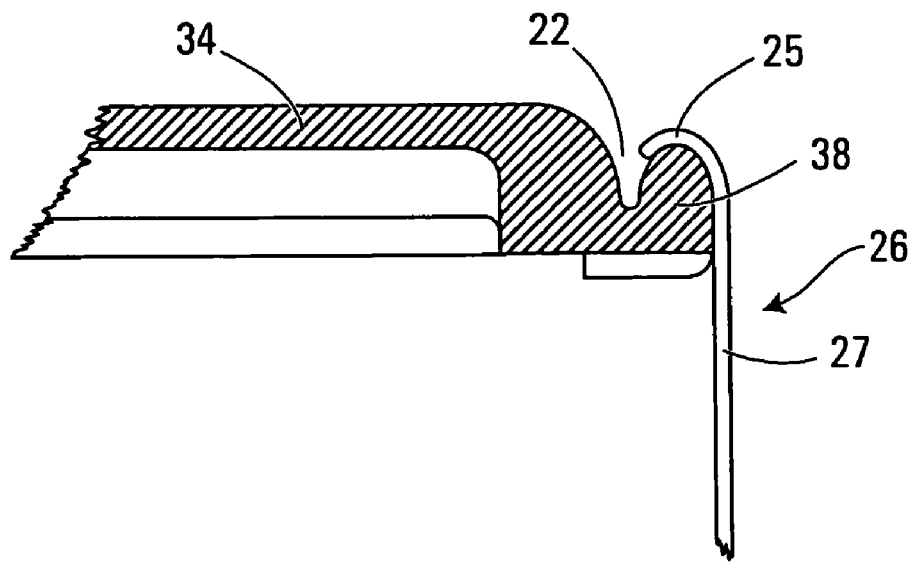
FIG. 3 is an enlarged partial front cross-sectional view of an example of a retaining apparatus in accordance with one embodiment of the invention.

As illustrated in FIG. 3, the anchoring device 26 comprises a hook portion 25 at its extremity and a main body 27 bearing the tension load of the compressed electrochemical cells. Hook portion 25 is moored to the outer edge 38 of the groove 22 of plate 34. Outer edge 38 is preferably designed to mate with the inner contours of the hook portion 25 to evenly distribute the force generated by the compressed electrochemical cells over the hook portion 25. Anchoring device 26 is preferably made of tempered steel such as ASTM A109 or spring steel such as 1095 or 1075 carbon steel.

Figure 2:
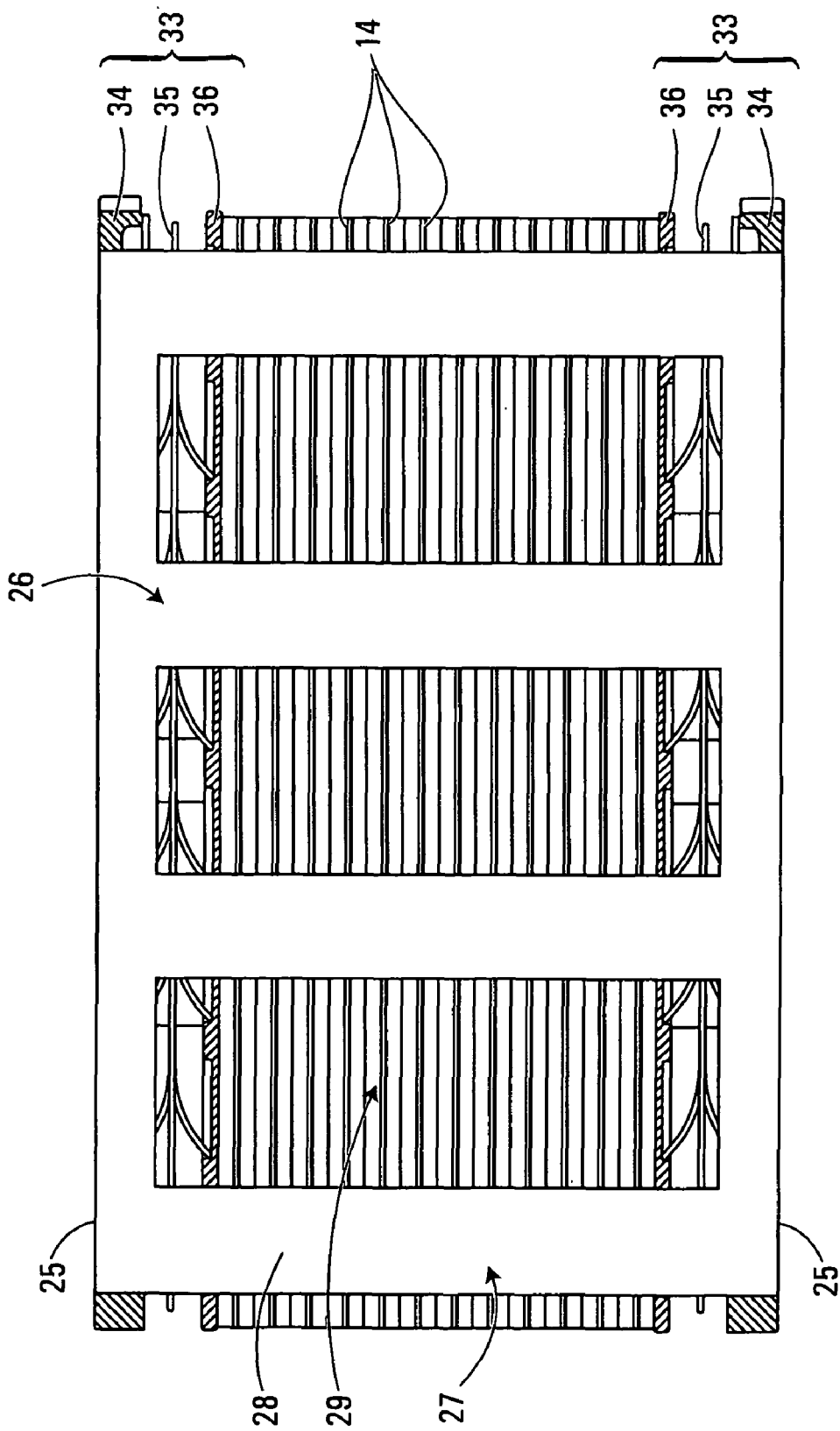
FIG. 2 is a schematic side elevational view of the electrochemical generator having a retaining apparatus in accordance with one embodiment of the invention.

Referring back to FIG. 2, one embodiment of the anchoring device 26 is a single steel plate wherein the upper and lower edges have been folded to form hook portions 25 which extend the entire length of anchoring device 26. The central portion of the single steel plate may be hollowed to reduce the weight of anchoring device 26 without significantly weakening it. In FIG. 2, the central portion or main body 27 of anchoring 26 comprises three openings 29 which form four load bearing members 28 that maintain the rear plates 34 within a predetermined distance from one another.

Figure 4:
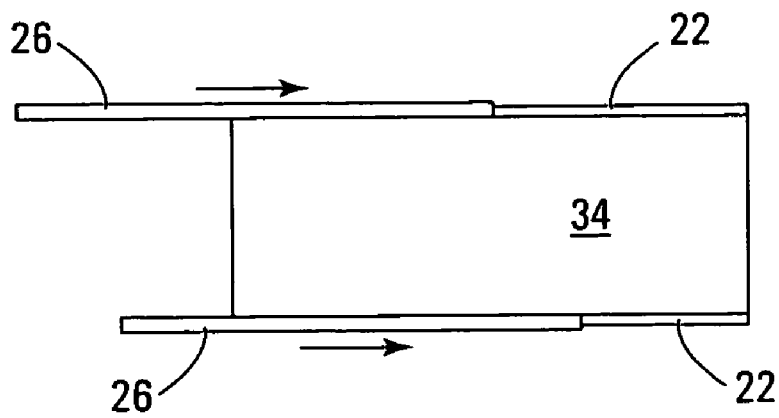
FIG. 4 is a schematic top plan view of an electrochemical generator illustrating the assembly of a retaining apparatus in accordance with one embodiment of the invention.

FIG. 4 illustrate the simple process of assembling anchoring devices 26 with holding members 34. The pressure producing apparatus 33 are positioned at each end or extremities of the stack of electrochemical cells 14 as shown in FIG. 1, this pre-assembly is then compressed by an hydraulic press or any other means to a predetermined pressure. While maintaining the pressure on the pre-assembly, the anchoring devices 26 are slid into the grooves 22. The pressure of the hydraulic press is released and the anchoring devices 26 maintain the stack of electrochemical cells 14 under pressure.

Since all electrochemical cells 14 do not have the exact same initial thickness, the distance between the holding members 34 of a pre-assembly may vary substantially for a given target pressure. To accommodate this variation of thickness of electrochemical cells 14 within the established tolerances which is compounded when a plurality of cells 14 are stacked together, a series of anchoring devices 26 of different lengths within the range of minimum and maximum distance between the holding members 34, is available to match the actual distance or length of the pre-assembly held under the target pressure.

It is also possible to use shimming plates of specific thickness and of equal surface areas to the electrochemical cells 14 to compensate the difference between the actual distance or length of the pre-assembly held under the target pressure and the available lengths of anchoring devices 26. The pre-assembly is compressed by the hydraulic press to the target pressure, the height of the pre-assembly is measured and the hydraulic press is released. This measurement is used to select the closest length of anchoring devices 26 from the available lengths of anchoring devices. If the available lengths of anchoring devices do not match the measured height within certain tolerances, a slightly longer anchoring device 26 is selected and a shimming plate of a specific thickness is added to the pre-assembly to fill in the gap between measured height of the pre-assembly and the chosen length of the available anchoring device 26.

Figure 5:
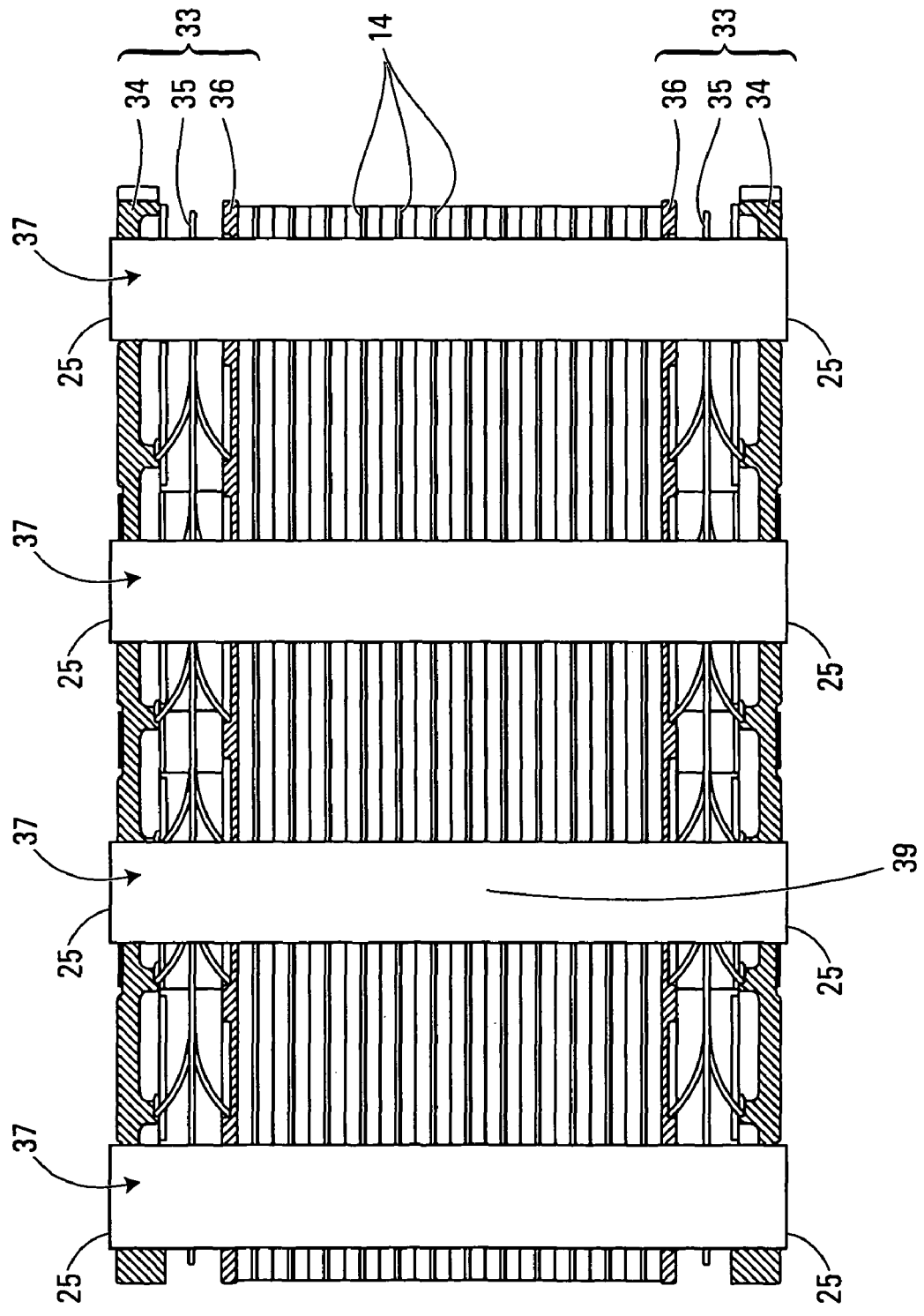
FIG. 5 is a schematic side elevational view of the electrochemical generator having a retaining apparatus in accordance with second embodiment of the invention.

FIG. 5 illustrates another embodiment of a retaining apparatus comprising rear plates or holding members 34 positioned at each extremity of the assembly of electrochemical cells 24 and a plurality of anchoring devices 37 instead of a single anchoring device 26 on each side of the stack of electrochemical cells. Each individual anchoring device 37 comprises a main body 39 bearing the tension load of the compressed electrochemical cells and hook portions 25 at its extremities for mooring to the groove 22 of holding members 34. The manufacturing of anchoring devices 37 is simpler but their assembly onto the pre-assembly stacked of electrochemical cells 14 is more time consuming since each anchoring device 37 must be assembled individually.

Figure 6:
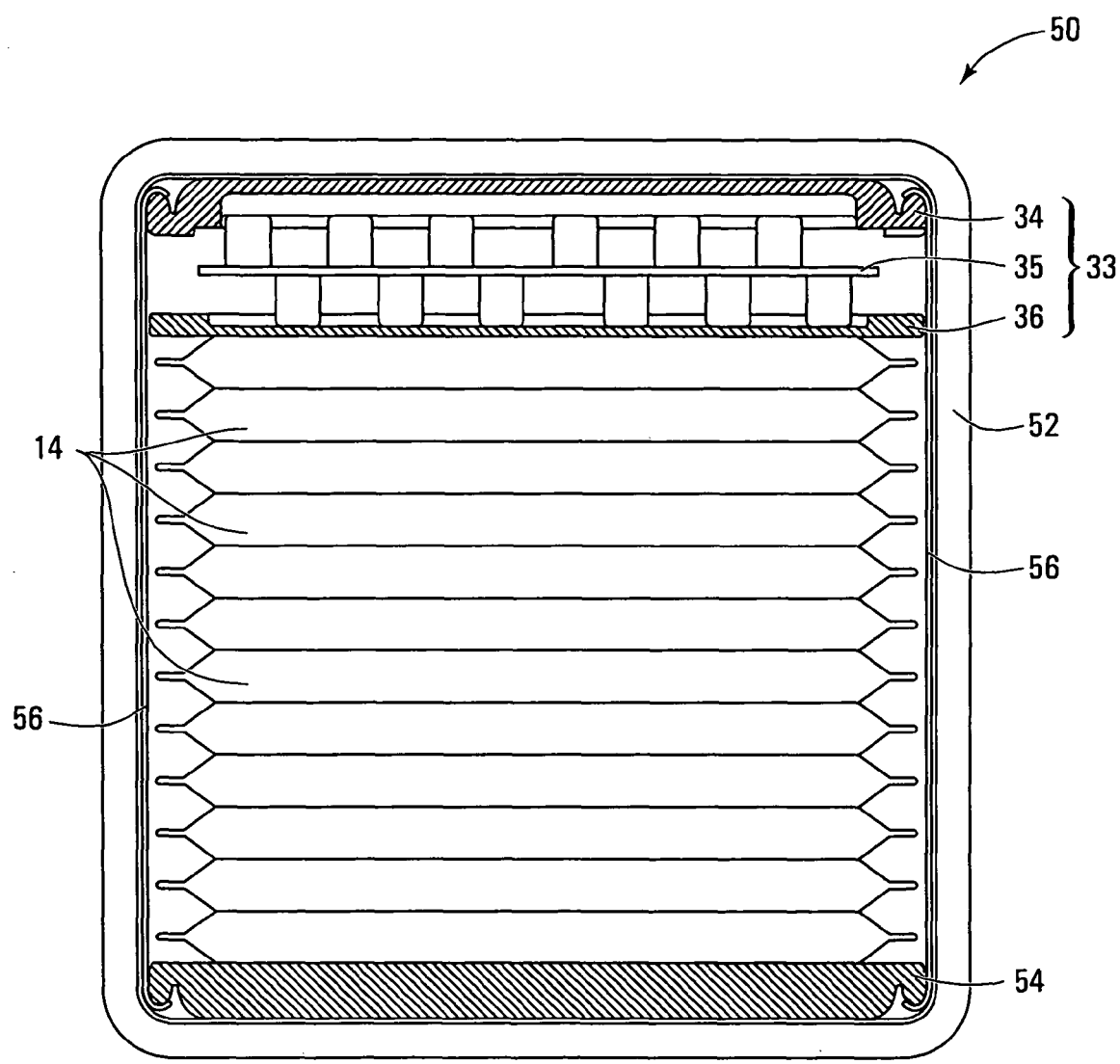
FIG. 6 is a schematic front cross-sectional view of an electrochemical generator having a retaining apparatus in accordance with another embodiment of the invention.

FIG. 6 illustrates a variant or another embodiment in accordance with the invention. There is shown an electrochemical generator 50 comprising a protective enclosure or casing 52 in which an array of electrochemical cells 14 are stacked together to form a battery. Electrochemical generator 50 includes a single pressure producing apparatus 33 positioned at one end of the stack of electrochemical cells 14 and a holding member 54 at the other end thereof.

The stacked electrochemical cells 14 are maintained in a state of compression by anchoring devices 56 which may be either anchoring devices 26 as shown in FIG. 2 or anchoring devices 37 as shown in FIG. 5. FIG. 6 illustrates that it is not essential to have a pressure producing apparatus at each extremity of the stack of electrochemical cells 14. A single pressure producing apparatus 33 may be used to accommodate the cyclical changes in the total volume of the stack of electrochemical cells 14 occurring during charge and discharge.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A process for making an electrochemical generator including an assembly of a plurality of stacked electrochemical cells each having an array of thin film laminates, the stacked electrochemical cells being maintained in a compressed state at a predetermined pressure; the process comprising the steps of:

providing a flat pressure plate and positioning it directly against the assembly of stacked electrochemical cells;

providing a spring plate and positioning it directly against the flat pressure plate;

providing a pair of substantially flat holding members, one positioned against the spring plate at one extremity of the stacked electrochemical cells and the other one positioned at the other extremity of the stacked electrochemical cells;

pressing the assembly of stacked electrochemical cells including the flat pressure plate and the spring plate between the pair of holding members to a target predetermined pressure;

measuring a distance between the pair of holding members once the assembly has reached the target predetermined pressure;

selecting at least two anchoring devices of a specific length corresponding to the measured distance between the pair of holding members from a series of anchoring devices of different lengths; and connecting the pair of holding members with the selected anchoring devices thereby maintaining the particular assembly of stacked electrochemical cells in a compressed state at the target predetermined pressure.

2. A process as defined in claim 1, further comprising the step of adding a shimming plate of a specific thickness between the assembly of stacked electrochemical cells and one of the holding members.

3. A process as defined in claim 1, wherein the anchoring devices comprise hook portions.

4. A process as defined in claim 3, wherein the holding members comprise a receptacle for mooring the hook portions of the anchoring devices.

5. A process as defined in claim 4, comprising the step of connecting the holding members with a pair of the anchoring devices, one on each side of the assembly of stacked electrochemical cells, each anchoring device being made of a single plate.

6. A process as defined in claim 4, comprising the step of connecting the holding members with a plurality of anchoring devices positioned on each side of the assembly of stacked electrochemical cells, each of the plurality of anchoring devices consisting of a narrow band having hook portions at its extremities.

7. A process as defined in claim 4, wherein the hook portions of the anchoring devices are slid into the receptacle of the holding members for connecting the pair of holding members.

* * * * *